Nov. 17, 1925.  
H. D. KELLY  
1,561,788  
LEACHER BUCKET  
Filed July 13, 1925
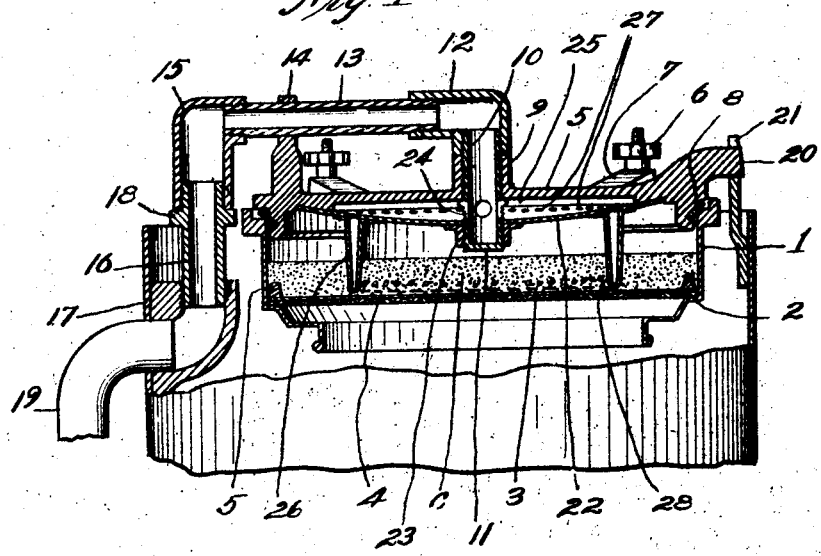
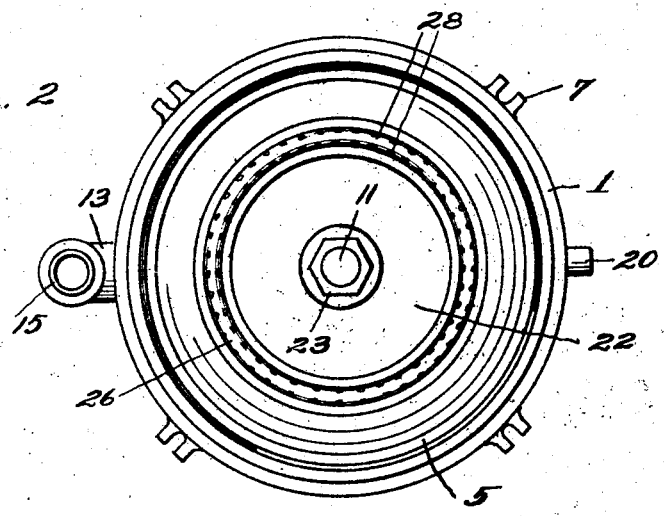
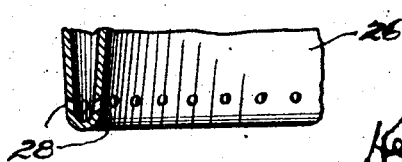

Patented Nov. 17, 1925.

1,561,788

UNITED STATES PATENT OFFICE.

HENRY D. KELLY, OF KANSAS CITY, MISSOURI.

LEACHER BUCKET.

Application filed July 13, 1925. Serial No. 43,213.

*To all whom it may concern:*

Be it known that I, HENRY D. KELLY, a citizen of the United States, and a resident of Kansas City, county of Jackson, State of Missouri, have invented a certain new and useful Improvement in Leacher Buckets, of which the following is a complete specification.

This invention relates to leacher buckets for use with coffe urns, and one of my objects is to produce a leacher bucket so constructed as to divide the ground coffee receptacle into a number of compartments so that such coffee may be maintained more evenly distributed over the filter in case the leacher bucket is tilted when being lifted to position at the top of the beverage jar. With the ordinary type of leacher bucket it has been found that the ground coffee is frequently all piled to one side on the filter and when the water first enters the leacher jar it will, in such case, pass through a very thin layer of ground coffee or even through the exposed filter paper and it has, therefore, been found desirable to provide means for retaining a substantially even distribution of the coffee over the entire area of the filter as described, should the leacher bucket be tilted or even inverted preliminary to its proper placement in the urn.

Another object is to produce leacher bucket having a cover provided with a removable water distributing plate carrying an annular depending ring having the dual function of retaining the ground coffee properly over the filter of the bucket and of discharging water into the mass of coffee so as to quickly saturate the entire mass.

Another object is to provide water discharge means which will invariably discharge the water into the mass of the ground coffee instead of discharging the water from a point above the coffee. With the more conventional type of water discharge, that is, from a point above the coffee, it is found that the beverage is invariably murky or cloudy, while when the water is discharged into the interior of the mass of the coffee it is clear or of good color.

With the objects named in view, the invention consists in certain novel and useful features of construction and organization, as hereinafter described and claimed; and in order that it may be fully understood, reference is to be had to the accompanying drawing, in which:—

Figure 1 is a central vertical section taken through a leacher bucket embodying the invention as it will appear when in operative relation with the top of a beverage jar shown in fragmental form.

Figure 2 is an inverted plan view of the cap of the leacher bucket.

Figure 3 is an enlarged broken sectional view of a portion of a depending annular water discharge member or flange which also divides the leacher bucket into compartments as will hereinafter appear.

In the said drawing, where like reference characters identify corresponding parts in all of the figures, 1 indicates any common or preferred type of leacher bucket, formed with a tapering bottom flange 2 which supports a screen 3, filter 4, and weight ring 5 as common in the art. The ground coffee C is placed on the filter 4 in a substantially even layer as illustrated, and the cover 5 is then placed in position on the top of the bucket 1 and is clamped down tightly by means of thumb screw clamps 6 pivotally mounted at their lower ends on the outside of the leacher bucket 1 and in engagement with forks 7 projecting from the periphery of the top of the bucket as common in the art, the said top being provided with any suitable gasket 8 so that it may be clamped down tightly in position.

The cover 5 is provided with a central upstanding internally-threaded flange 9 in which is threaded a nipple 10 projecting at both sides of the cover, the lower end of the nipple being closed as at 11 and the upper end being engaged by an elbow 12 to which is connected a short pipe section 13 secured to an upstanding bracket 14 for supporting purposes and also to form a convenient handle in the manipulation of the leacher bucket. The end of the pipe 14 communicates with a second elbow 15 which is adapted to slidingly fit on the end of a nipple 16 carried by the urn 17, and to be supported in position by contact with a shoulder 18 on said nipple. The nipple 16 communicates with the boiler chamber (not illustrated) through a pipe 19, as common in the art. As a means of assisting the operator in the proper placing of the leacher bucket, the top of the bucket is formed with a projecting lug 20 which is received between the tines of a fork 21 carried by the wall of the urn, as illustrated.

The inner face of the cover 5 is recessed for reception of a dished circular plate 22, said plate being tightly clamped in position by a nut 23 threaded on the lower end of the nipple 10. The nipple 10 is provided with a series of openings 24 communicating with the water chamber 25 formed between the cover 5 and the plate 22.

In order to provide a partition for dividing the leacher bucket into a plurality of compartments so the ground coffee cannot all pile to one side of the filter should the leacher bucket be tilted in the process of raising it into position, an annular hollow water discharge ring and partition 26 projects downwardly from the plate 22 and terminates just short of or, if desired, in contact with the filter 4 closing the leacher bucket. The plate 22 is formed with a series of water discharge orifices 27 communicating with the cavity of the ring 26, and said ring is formed at its lower end with a double series of opposed discharge orifices 28, said orifices being preferably inclined slightly upwardly as illustrated in Figure 3.

From the above description, it will be apparent that when steam pressure is generated in the boiler chamber and boiling water is forced up through the connections 19 and 13 into the water compartment 25 of the leacher bucket, that said water will enter the hollow partition 26 through the openings 27 in the plate 22, and will be forcibly discharged through the orifices 28 into the mass of coffee resting on the filter 4. It will also be evident that the ring by projecting to a point in close proximity to the filter in effect forms a two compartment leacher bucket, the compartments being of such area that the coffee contained therein will always substantially cover the filter in an even layer regardless of the degree of accidental tilting to which the leacher bucket may be subjected in the process of raising it to position in the top of the urn. By thus retaining the ground coffee against shifting, discharge of water below the surface of the ground coffee is assured and a beverage of better color is obtained.

From the above description, it will be apparent that I have produced a device of the character described which possesses all of the features of advantage pointed out as desirable, and while I have described and claimed the preferred embodiment of the same, I reserve the right to make all changes properly falling within the spirit and scope of the appended claims.

I claim:

1. A leacher bucket, a cover for said bucket, and a partition depending from said cover and forming a plurality of compartments within said leacher bucket.

2. A leacher bucket, a cover for said bucket, and an annular partition depending from said cover and forming a plurality of compartments within said leacher bucket.

3. A leacher bucket, a cover for said bucket, a plate secured to the underside of the cover and forming a water compartment having a series of water exit openings, and an annular partition depending from said plate.

4. A leacher bucket, a cover for said bucket having a water chamber, and an annular hollow partition receiving water from said chamber and dividing said bucket into a plurality of compartments, said partition being formed with water discharge openings.

5. A leacher bucket, a cover for said bucket, a plate secured to the underside of said cover and forming a water compartment and having a series of exit openings, an annular hollow partition dividing the bucket into a series of compartments and in communication with the plate-exit openings; said partition being formed with a plurality of water discharge openings for discharging water adjacent the bottom of the leacher bucket into the coffee contained therein.

In witness whereof I hereunto affix my signature.

HENRY D. KELLY.